United States Patent
Tian et al.

(10) Patent No.: US 10,184,053 B2
(45) Date of Patent: Jan. 22, 2019

(54) PIGMENT-TYPE ULTRAVIOLET LIGHT CURABLE COATING FOR WINDOW FILM AND PREPARATION METHOD THEREFOR

(71) Applicant: ZHEJIANG NAMEI MATERIAL TECHNOLOGY CO., LTD., Huzhou (CN)

(72) Inventors: Yao Tian, Huzhou (CN); Lei Zhao, Huzhou (CN); Ruoxin Li, Huzhou (CN); Tao Zhang, Huzhou (CN); Jun Chen, Huzhou (CN)

(73) Assignee: ZHEJIANG NAMEI MATERIAL TECHNOLOGY CO., LTD., Huzhou (CN)

(*) Notice: Subject to any disclaimer, the term of this patent is extended or adjusted under 35 U.S.C. 154(b) by 33 days.

(21) Appl. No.: 15/500,506

(22) PCT Filed: May 12, 2015

(86) PCT No.: PCT/CN2015/078722
§ 371 (c)(1),
(2) Date: Jan. 30, 2017

(87) PCT Pub. No.: WO2016/179787
PCT Pub. Date: Nov. 17, 2016

(65) Prior Publication Data
US 2017/0210908 A1  Jul. 27, 2017

(51) Int. Cl.
| | | |
|---|---|---|
| C09D 7/40 | (2018.01) | |
| C09D 7/61 | (2018.01) | |
| C09D 7/45 | (2018.01) | |
| C09D 7/47 | (2018.01) | |
| C09D 7/63 | (2018.01) | |
| C09D 7/41 | (2018.01) | |
| C09D 4/00 | (2006.01) | |
| C09D 5/00 | (2006.01) | |
| C08F 2/48 | (2006.01) | |
| C09D 133/06 | (2006.01) | |
| C09D 175/16 | (2006.01) | |
| C09D 5/32 | (2006.01) | |
| C09D 4/06 | (2006.01) | |

(52) U.S. Cl.
CPC .......... *C09D 7/40* (2018.01); *C08F 2/48* (2013.01); *C09D 4/00* (2013.01); *C09D 4/06* (2013.01); *C09D 5/00* (2013.01); *C09D 5/32* (2013.01); *C09D 7/41* (2018.01); *C09D 7/45* (2018.01); *C09D 7/47* (2018.01); *C09D 7/61* (2018.01); *C09D 7/63* (2018.01); *C09D 133/06* (2013.01); *C09D 133/066* (2013.01); *C09D 175/16* (2013.01)

(58) Field of Classification Search
CPC ... C09D 4/00; C09D 7/40; C09D 4/06; C09D 5/32; C09D 133/066; C09D 175/16; C09D 7/61; C09D 7/63; C09D 5/00; C09D 133/06; C09D 7/47; C09D 7/41; C09D 7/45; C08F 2/48
USPC ............................................. 522/96; 523/160
See application file for complete search history.

(56) References Cited

U.S. PATENT DOCUMENTS

| | | | | |
|---|---|---|---|---|
| 6,093,455 A | * | 7/2000 | Kamen | .................... B41M 1/34 427/282 |
| 7,781,493 B2 | * | 8/2010 | Baikerikar | ............ C03C 17/007 522/91 |
| 2003/0162859 A1 | * | 8/2003 | Krohn | ....................... C09D 4/00 522/81 |
| 2006/0287408 A1 | * | 12/2006 | Baikerikar | ............ C03C 17/007 522/71 |
| 2007/0213427 A1 | * | 9/2007 | Lehmann | ................ C03C 17/32 523/160 |

FOREIGN PATENT DOCUMENTS

| | | |
|---|---|---|
| CN | 1788045 Y | 6/2006 |
| CN | 102260453 Y | 11/2011 |
| CN | 104177885 Y | 12/2014 |

(Continued)

OTHER PUBLICATIONS

Technial Datasheet for CN 985B88 supplied by Sartomer. Obtain online on [Apr. 27, 2018]. Obtained from Internet <URL:https://adhesives.specialchem.com/product/m-sartomer-arkema-group-cn-985b88?p=1>. (Year: 2016).*

(Continued)

*Primary Examiner* — Sanza L. McClendon
(74) *Attorney, Agent, or Firm* — Hershkovitz & Associates, PLLC; Abe Hershkovitz

(57) ABSTRACT

The present invention relates to an UV coating special for PET window film and its preparation method. A pigmented UV-curable window-film coating comprising the following components in parts by mass: UV monomer: 3-40, modified acrylate: 10-50, photoinitiator: 1-10, leveling agent: 0.4-2, pigment: 3-20, coupling agent: 0.5-1.5 and dispersant: 0.4-0.8. The pigmented window film according to the present invention has the functions of being difficult to fade, UV resistance and excellent outdoor weather-resistance as well as the functions of surface-scratch resistance. The color or hue of the pigment itself can remain unchanged for several or even a dozen years. Thus, a PET window film produced from a pigment with good weather resistance can guarantee that it will keep its original color for several to a dozen years and its performance will not be influenced by outdoor environmental factors.

8 Claims, No Drawings

(56) References Cited

FOREIGN PATENT DOCUMENTS

| CN | 104448975 Y | 3/2015 |
|----|-------------|--------|
| CN | 104513612 Y | 4/2015 |
| CN | 104559776 Y | 4/2015 |
| CN | 104789110 E | 7/2015 |

OTHER PUBLICATIONS

International Search Report of PCT Patent Application No. PCT/CN2015/078722 dated Jan. 21, 2016.

\* cited by examiner

PIGMENT-TYPE ULTRAVIOLET LIGHT CURABLE COATING FOR WINDOW FILM AND PREPARATION METHOD THEREFOR

FIELD OF TECHNOLOGY

The present invention relates to the application of the weather-resistant transparent pigment in the photo-curable coating, especially to an UV coating special for PET window film and preparation method thereof.

BACKGROUND

The plastic window-film coating is mainly applied in the two categories of cars and buildings. The functions of window film coating by a coating include adjusting indoor visible intensity, reducing the irritation to eyes as well as blocking the UV and IR rays from the sun light. The reduction of outdoor light entrance can prevent the irradiation of harmful rays to the human body, lessen the possible damage to the interior decorations, reduce the entrance of IR rays and lower the indoor temperature to save energy.

The modern processes to produce window films include roller coating or metal sputtering. The process of metal sputtering utilizes the principles of electric field and magnetic field to evenly sputter the metal particles at high speed and high power onto a PET substrate with high tension to form a magnetron sputtering window film. However, such films are very expensive to produce and not affordable to the users. On the contrary, the conventional processes of roller coating have the merits of low production cost, good plastic adhesion and high transparency, etc. So far, most of window films available in the market are produced using the UV-curable roller coating process. The UV-curable coating is characterized by high curing speed, low production cost, excellent quality and convenience for mass production.

The UV curing is mainly shown on the outermost layer of window film. This layer of colorless UV coating functions to increase the surface hardness of PET substrate and enhance the scratch resistance to enable the plastic window film not to be worn during the daily uses. On the other surface of PET is the gluing layer whose function is to make the PET plastic film to adhere to the glass surface firmly. As per the application environments, the light transmittance of a window film can be adjusted in a range of 5%-90%. The existing coloring agents are mainly dyes which can be used to adjust the colors with the characteristics such as high transparency, convenient handling and low production cost. Thus, the dyes are widely applied in adjusting the color of window film. Although the dyes have the advantages as above, they tend to decompose and fade, especially in the environment exposed to strong UV radiation. Thus, the coloring agent of dye is usually added in the gluing layer of window film in the process of window-film production to prevent UV direct radiation. Moreover, the dye is poor in outdoor weather resistance. If used outdoors for long time, the window film tends to fade and lose some transparency and show a poor appearance. Thus, the window film will give a shortened service life. Moreover, the dye itself cannot provide the function of thermal insulation and UV blocking, etc. At the same time, the dyes are expensive and will cause serious pollution during production. Thus, the application of the dye-type window films is limited. Therefore, the field is expecting a window-film product with good weather resistance and some heat shielding and UV blocking.

SUMMARY

In order to smooth away the aforementioned problems, the present invention provides a pigmented UV-curable window-film coating. This coating is coated on a window film without primer and then cured by UV lamp radiation to enable the window film not to fade, giving high transparency, long service life, wide visible light transmittance and high rejection rate of UV/IR light.

The technical solution according to the present invention used to solve the aforementioned problems is as follows:

A pigmented UV-curable window-film coating comprising the following components in parts by mass:

| | |
|---|---|
| UV monomer | 3-40 |
| Modified acrylate | 10-50 |
| Photoinitiator | 1-10 |
| Leveling agent | 0.4-2 |
| Pigment | 3-20 |
| Coupling agent | 0.5-1.5 |
| Dispersant | 0.4-0.8. |

As the preferable candidate of the aforementioned technical solution, said window-film coating comprises the following components in parts by mass:

| | |
|---|---|
| Acrylate UV monomer | 3-37 |
| Modified polyurethane acrylate | 27-45 |
| Photoinitiator | 1-8.5 |
| Modified organosilicon leveling agent | 0.4-1.5 |
| Pigment | 3.5-7 |
| Silanecoupling agent | 0.5-1.5 |
| Polymeric dispersant | 0.4-0.8. |

As the preferable candidate of the aforementioned technical solution, said acrylate UV monomer comprises 1-4 parts by mass of acrylate monomers with mono functional group and 2-33 parts by mass of acrylate monomers with multiple functional groups, said acrylate monomer with mono functional group comprises one or more selected from isooctyl acrylate, isobornyl methacrylate, phenoxyethyl acrylate and tetrahydrofurfuryl acrylate, said acrylate monomer with multiple functional groups comprises at least two selected from dipropylene glycol diacrylate, tripropylene glycol diacrylate, 1,6-hexanediol diacrylate, neopentyl glycol diacrylate, phthalate diethylene glycol diacrylate, trimethylolpropane triacrylate, pentaerythritol triacrylate, ethoxylated trimethylolpropane triacrylate, dioxolane acrylate, alkoxylated bisphenol A dimethacrylate and ethylene glycol acrylate methylphosphonate.

The present invention utilizes the combination of several acrylic monomers to adjust the viscosity of coating and as the solvents to evenly scatter the pigment. Moreover, they can improve the performance of coating process and ensure the compatibility with the acrylic resin.

In the aforementioned technical solution according to the present invention, a pigment is not the same as a dye. The dyes are the organic compounds that can dye a fiber or other substrate to some color. They are mainly used in the dyeing and printing of fabrics and most of them are soluble in water or can be transformed into soluble condition upon dyeing through some chemical processing. Some dyes are insoluble in water but soluble in alcohols or oils and can be used to color the materials such as oil wax and plastics. The pigments are colorful organic or inorganic compounds insoluble in water and ordinary organic solvents. Not all the colorful materials can be used as organic pigment. For a colorful substance to be used as pigment, it must possess the following properties: 1) bright color to exert a solid color for the colored material (or substrate); 2) insolubility in water, organic solvents or application medium; 3) easiness to evenly disperse in application and being not affected physically and chemically by the application medium during the whole course of dispersion so as to maintain the intrinsic crystal structure; 4) resistance to sun light, weathering, heat, acid and base as well as organic solvents. Compared with a dye, an organic pigment is different to some extent in the application performance. The conventional application of a dye is to dye the textiles. However, the pigments are used conventionally to color the non-textiles (such as oil ink, paint, coating, plastic and rubber). It is because the dyes have affinity to the textiles and can be adsorbed and fixed by the fiber molecules; but the pigments have no affinity to any coloring subject and are bound to the coloring subject mainly by resin, adhesive or other film-forming matter. When a dye is used, usually it is firstly dissolved in the working medium. Even for a disperse dye or a vat dye, it will also undergo a course from dissolving in water from the crystal state into the molecular state and then dyeing on to the fiber. Thus, the color of dye is not the color that it is on the fabrics. For the pigment, because it is insoluble in the working medium during the course of usage, so it always exists in the original state of crystal. Thus, the color of the pigment shows its color in the substrate. Just because of this, the crystal state of the pigment is very important for a pigment although such crystal state of a dye is not so important or it can be said that the crystal state of dye is not closely related to its dyeing behavior. Although the dye and the pigment are different concepts, they are commonly used in some special cases. For example, some anthraquinone vat dyes are insoluble and can be used as pigment after pigmentation. Thus, these dyes are referred to as pigmented dyes or dyeing pigment. The pigments used by the present invention can be one such as carbon block, aniline black, Permanent Yellow, Permanent Orange G, Permanent Orange RL, golden red, Lithol Red, Pigment Red G, phthalocyanine blue, Indanthrone, phthalocyanine green, Quinacridone Violet and TiO$_2$.

As the preferable candidate of the aforementioned technical solution, said modified polyurethane acrylate is one or more selected from the amine modified polyurethane acrylate, the epoxy modified polyurethane acrylate, the polyether modified polyurethane acrylate and the unsaturated-epoxy modified polyurethane acrylate, The aforementioned polyurethane acrylate can be the market available products such as the products by Sartomer Company. Allnex Company and Sanmu company. As the main body of a coating, it make the coating with certain hardness and scratch resistance.

As the preferable candidate of the aforementioned technical solution, said photoinitiator is one or more selected from 1-hydroxycyclohexyl phenyl ketone, 2-methyl-1-(4-methylthiophenyl)-2-morpholinyl-1-propanone, ethyl 4-dimethylaminobenzoate, methyl-o-menzoylbenzoate, 4-phenylbenzophenone and 2,4,6-trimethylbenzoyl-diphenylphosphine oxide.

As the preferable candidate, said modified organic silicon leveling agent is one or more selected from XX modified polysiloxane, polyether-polyester modified silicone emulsion and polydimethylsiloxane.

The effect of the aforementioned modified organic silicon leveling agent is to exert a good wettability and leveling property between the coating and the substrate and make the coating even and flat.

As the preferable candidate, said pigment can be one such as carbon block, aniline black, Permanent Yellow, Permanent Orange G, Permanent Orange RL, golden red. Lithol Red, Pigment Red G, phthalocyanine blue, Indanthrone, phthalocyanine green, Quinacridone Violet and TiO$_2$.

The effect of the pigment is to provide a coloring agent that has high transparency after grinding and small grain size. Through adjusting the adding amount, various transmittances can be achieved.

As the preferable candidate, said coupling agent is one or more selected from γ-aminopropyltriethoxysilane, 3-(2-aminoethyl)-aminopropyltriethoxysilane, N-phenyl-γ-aminopropyltrimethoxysilane and 3-(2,3-epoxypropoxy)propylmethyldiethoxysilane. The effect of coupling agent is to exert a good anti-oxidation and polymerization inhibition during the course of coating curing and accelerate the curing speed of coating after UV radiation.

As the preferable candidate, said polymeric dispersant can be one or more selected from amino acid ester copolymers, polyester-type copolymers, and polyolefin-based copolymers.

The effect of the polymeric dispersant is to improve the compatibility between the pigment and monomer during producing the mixture slurry of them to disperse the pigment evenly in the coating and scatter the color of coating evenly during coloring process.

One other purpose of the present invention is to provide a preparation method of the aforementioned coating, whose technical solution is as follows:

The following steps are comprised:

Step 1. Put the pigment, acrylate UV monomer, polymeric dispersant, coupling agent and modified organosilicon leveling agent into a grinding miller to grind 1-3 hours and then filter to obtain the slurry, Step 2. Put the slurry obtained from Step 1 and the modified polyurethane acrylate into an agitation vessel to disperse 10-30 minutes, Step 3. Put the photoinitiator into the agitation vessel to mix 10-30 minutes to obtain said coating.

In conclusion, the present invention has the following beneficial effects:

The pigmented window film has the functions of being difficult to fade, UV resistance and excellent outdoor weather resistance. The color or hue of the pigment itself can remain unchanged for several or even a dozen years. So that the original color of a PET window film produced by using the pigment with good weather resistance can be kept unchanged for several years and more than ten years, and the performances of the window film cannot be influenced by outdoor environmental factors. Among various weather-resistant pigments, inorganic carbon black has further heat insulation and UV rejection, and its chemical stability and optical filter property are preferable among the pigmented window films.

The pigments, especially those of carbon black have vast advantages for outdoor applications. Nevertheless, the transparency and compounding stability of a pigment are usually inferior to a dye.

Meanwhile, the present invention also describes that the selection of different resins and additives as well as their consumption amount will pose a great influence on the products by coating process and can directly affect the usage performance of end users.

DESCRIPTION OF THE EMBODIMENTS

In order to deepen the understanding to the present invention, the following embodiments are used to further describe the present invention in detail. Nevertheless, the following embodiments are just used to explain the present invention rather than constituting any limitation on the protection scope of the present invention.

Embodiment 1

This embodiment provides an UV-curable coating for protecting colored window-film that is prepared through the following preparation method:

Mix 33 parts by mass of acrylic ester monomer including dipropylene glycol diacrylate, 3 parts by mass of isobornyl methacrylate, 4 parts by mass of carbon black and 0.3 parts by mass of amino acid ester copolymer (Cognis P61), grind them for 180 minutes. Then filter to obtain the slurry. Place the slurry, 35 parts by mass of amine modified urethane acrylate, 4 parts by mass of 2-hydroxy-methylphenylpropan-1-one, 0.6 parts by mass of γ-aminopropyltriethoxysilane and 0.8 parts by mass of polyether modified silicone into an agitation vessel to agitate and mix to obtain a finished pigmented UV-curable coating for protecting window film.

The coating obtained according to the present invention will not fade after sunlight exposure with the premise of ensuring other performances.

Embodiment 2

This embodiment provides an UV-curable coating for protecting colored window-film that is prepared through the following preparation method:

Place 2 parts by mass of hydroxypropyl acrylate, 29 parts by mass of pentaerythritol triacrylate, 20 parts by mass of 2-butoxymethylethyl-1,3-propanediyl-2-acrylate and 8 parts by mass of carbon black as well as 0.6 parts by mass of high-molecular polymer (Elementis DP983) into a grinding vessel to grind for 180 minutes before filtering to obtain the slurry. Then place the slurry and 30 parts by mass of acrylic modified polyurethane (Jiangsu Sanmu SM-60217) into an agitation vessel to agitate for 30 minutes. Then place 0.05 parts by mass of polyether-polyester modified polysiloxane (TEGO 410) and γ-aminopropyltriethoxysilane (Jessica HK550) into the agitation vessel to agitate for 20 minutes. Finally, add 5 parts by mass of 2,4,6-trimethylbenzoyl-diphenylphosphine oxide to agitate for 15 minutes and obtain the finished product of UV-curable coating for protecting colored window film.

The coating obtained according to the present invention will not fade after sunlight exposure with the premise of ensuring other performances.

Embodiment 3

This embodiment provides an UV-curable coating for protecting colored window-film that is prepared through the following preparation method:

Place 3 parts by mass of aliphatic urethane diacrylate, 27 parts by mass of isobornyl acrylate, 30 parts by mass of trimethylolpropane diacrylate, 6 parts by mass of carbon black, 3 parts by mass of PHTHALO BLUE, 0.8 parts by mass of high-molecular polymeric dispersant BYK-9076 into a grinding vessel to grind for 160 minutes before filtering to obtain the slurry. Then place the slurry and 27 parts by mass of fatty-acid modified epoxy diacrylate (Wuxing Chemical G522) into an agitation vessel to agitate for 30 minutes. Then place 0.05 parts by mass of polyether-polyester modified polysiloxane (TEGO 410) and γ-aminopropyltriethoxysilane (Jessica HKS50) into the agitation vessel to agitate for 20 minutes. Finally, add 5 parts by mass of 2,4,6-trimethylbenzoyl-diphenylphosphine oxide to agitate for 15 minutes and obtain the finished product of UV-curable coating for protecting colored window film.

The coating obtained according to the present invention has a transmittance of 18% with a coating thickness of 3 μm and will not fade after sunlight exposure with the premise of ensuring other performances.

Embodiment 4

This embodiment provides an UV-curable coating for protecting colored window-film that is prepared through the following preparation method:

Place 3 parts by mass of 1,4-cyclohexanedimethanol dimethacrylate, 28 parts by mass of ethoxylated dipentaerythritol hexaacrylate, 26 parts by mass of dodecyl methacrylate, 5 parts by mass of carbon black, 2 parts by mass of PHTHALO BLUE, 1 part by mass of Pigment Red 122, 0.9 parts by mass of high-molecular polymeric dispersant BYK-1790 into a grinding vessel to grind for 190 minutes before filtering to obtain the slurry. Then place the slurry and 30 parts by mass of fatty-acid modified epoxy diacrylate (Wuxing Chemical G522) into an agitation vessel to agitate for 30 minutes. Then place 0.05 parts by mass of polyether-polyester modified polysiloxane (TEGO 370) and γ-aminopropyltriethoxysilane (Jessica HK550) into the agitation vessel to agitate for 20 minutes. Finally, add 5 parts by mass of 2,4,6-trimethylbenzoyl-diphenylphosphine oxide to agitate for 15 minutes and obtain the finished product of UV-curable coating for protecting colored window-film.

The coating obtained according to the present invention has a transmittance of 44% with a coating thickness of 3 μm and will not fade after sunlight exposure with the premise of ensuring other performances.

Embodiment 5

This embodiment provides an UV-curable coating for protecting colored window-film that is prepared through the following preparation method:

Mix 20 parts by mass of 2-phenoxyethyl methacrylate, 10 parts by mass of isobornyl methacrylate, 9 parts by mass of carbon black and 0.3 parts by mass of amino acid ester copolymer (Cognis P61), grind them for 230 minutes. Then filter to obtain the slurry. Place the slurry, 32 parts by mass of amine modified urethane acrylate, 1 part by mass of 2-hydroxy-methylphenylpropan-1-one, 0.6 parts by mass of γ-aminopropyltriethoxysilane and 0.8 parts by mass of polyether modified silicone into an agitation vessel to agitate and mix to obtain a finished pigmented UV-curable coating for protecting window film.

The coating obtained according to the present invention has a measured haze value of 1.7% when the coating thickness is 2 μm, meeting the requirement of 2% by the window-film industry. Meanwhile, it will not fade after sunlight exposure with the premise of ensuring other performances.

Dilute the UV coating solution compounded as above to a solid content of 25-40% and the diluting solvents include butyl ester, butanone and isopropanol, etc. Coat the diluted UV coating solution on a PET film through roller coating. After a process of baking for 2 minutes in the oven to remove the organic solvent, cure the coating under UV lamp and then conduct the following processes including taking up. The hardened window-film product needs to be subject to a series of functional tests. The detailed test methods are as follows.

Hardness test: Coat the protecting colored window-films provided in Embodiments 1-2 with the UV-curable coating. Then measure their hardness with a pencil hardness tester. The results show that the hardness of the window films in Embodiment 1 and Embodiment 2 both amounts to 3H, meeting the requirement on window-film hardness.

Transmittance test: as per the method specified by GB2410-80. Conduct the test with LS105A Transmittance tester by Linshang Technology. The transmittance of visible light of the coating by Embodiment 1 is 40% and that by Embodiment 2 is 1.9%, meeting the current requirement on the transmittance of car window-film.

Haze test: Conduct the test as per GB2410-80. The haze of the window films prepared with the coatings by Embodiment 1 and 2 is respectively 1.7% and 1.8%, meeting the quality criterion of <2% required by the current window-film standard.

Weather-resistance test: Conduct the test as per GB/T 29365-2012. Either of the weather resistance of the window films prepared with the coatings by Embodiment 1 and 2 achieves over 10 years, meeting the current requirement of window films.

|  | Embodiment 1 | | Embodiment 2 | |
| --- | --- | --- | --- | --- |
| Component | Component | Parts by mass | Component | Parts by mass |
| UV monomer | Dipropylene glycol diacrylate | 33 | Pentaerythritol triacrylate | 29 |
|  | Isobornyl methacrylate | 3 | 2-butoxymethylethyl-1,3-propanediyl-2-acrylate | 20 |
|  |  |  | Hydroxypropyl acrylate | 2 |
| Oligomer | Amine modified urethane acrylate | 35 | Acrylic modified polyurethane (Jiangsu Sanmu SM-60217) | 30 |
| Photoinitiator | 2-hydroxy-methylphenylpropan-1-one | 4 | 2,4,6-trimethylbenzoyl-diphenylphosphine oxide | 5 |
| Leveling agent | Polyether modified organicsilicon | 0.8 | Polyether-polyester modified polysiloxane (TEGO 410) | 0.05 |
| Coupling agent | γ-aminopropyltriethoxysilane | 0.6 | Aminopropyltriethoxysilane (Jessica HK550) |  |
| Dispersant | Amino acid ester copolymer (Cognis P61) | 0.3 | High-molecular polymer (Elementis DP983) | 0.6 |
| Pigment | Carbon black | 4 | Carbon black | 8 |

|  | Embodiment 3 | |
| --- | --- | --- |
| Component | Component | Parts by mass |
| UV monomer | Trimethylolpropane diacrylate | 30 |
|  | Isobornyl acrylate | 27 |
|  | Aliphatic polyamide diacrylate | 3 |
| Oligomer | Fatty-acid modified epoxy diacrylate (Wuxing Chemical G522) | 27 |
| Photoinitiator | 2,4,6-trimethylbenzoyl-diphenylphosphine oxide | 5 |
| Leveling agent | Polyether-polyester modified polysiloxane (TEGO 410) | 0.05 |
| Coupling agent | γ-aminopropyltriethoxysilane (Jessica HK550) |  |
| Dispersant | Polymeric dispersant BYK-9076 | 0.8 |
| Pigment | Carbon black | 6 |

|  | Embodiment 4 | | Embodiment 5 | |
| --- | --- | --- | --- | --- |
| Component | Component | Parts by mass | Component | Parts by mass |
| UV | Ethoxylated dipentaerythritol hexaacrylate | 28 | 2-phenoxyethyl methacrylate | 20 |
|  | Dodecyl methacrylate | 26 | Isobornyl methacrylate | 10 |
|  | 1,4-cyclohexanedimethanol dimethacrylate | 3 |  |  |
| Oligomer | Fatty-acid modified epoxy diacrylate (Wuxing Chemical G522) | 30 | Amine modified urethane acrylate | 32 |
| Photoinitiator | 2,4,6-trimethylbenzoyl-diphenylphosphine oxide | 5 | 2-hydroxy-methylphenylpropan-1-one | 1 |
| Leveling agent | Polyether-polyester modified polysiloxane (TEGO 410) | 0.05 | Polyether modified organicsilicon | 0.8 |
| Coupling | γ-aminopropyltriethoxysilane (Jessica HK550) |  | γ-aminopropyltriethoxysilane | 0.6 |
| Dispersant | Polymeric dispersant BYK-9076 | 0.9 | Amino acid ester copolymer (CognisP61) | 0.3 |
| Pigment | Carbon black | 5 | Carbon black | 9 |
|  | PHTHALO BLUE | 2 |  |  |
|  | Pigment Red 122 | 1 |  |  |

The following are the test data of the five embodiments:

|  | Embodiment 1 | Embodiment 2 | Embodiment 3 | Embodiment 4 | Embodiment 5 |
| --- | --- | --- | --- | --- | --- |
| Color | Black | Black | Navy | Tawny | Super-transparent |
| Window-film surface hardness | 750 g/>3H | 750 g/≥3H | 750 g/≈3H | 750 g/≥3H | 750 g/>3H |

-continued

|  | Embodiment 1 | Embodiment 2 | Embodiment 3 | Embodiment 4 | Embodiment 5 |
|---|---|---|---|---|---|
| Transmittance of visible light | 40% | 19% | 18% | 44% | 30% |
| Haze of window film | 1.9% | 1.97% | 1.68 | 1.87 | 1.7 |
| Weather-resistance years of window film | >10 | >10 | >10 | >10 | >10 |

It can be seen from the test results above that after the scratch-resistant coatings provided by Embodiment 1-5 according to the present invention are coated on the surfaces of the window films and top-grade of protective films, they not only can achieve a high hardness, but also exert a relatively high transmittance. Thus, this demonstrates that the scratch-resistant coating according to the present invention is an UV-curable coating for protecting colored window film that can be prepared into a scratch-resistant coating characteristic in appropriate hardness and good light transmission.

The invention claimed is:

1. A pigmented UV-curable window-film coating comprising the following components in parts by mass relative to the coating:
   Acrylate UV monomer 3-37
   Modified polyurethane acrylate 27-45
   Photoinitiator 1-8.5
   Modified organosilicon leveling agent 0.4-1.5
   Pigment 3.5-7
   Silane coupling agent 0.5-1.5
   Polymeric dispersant 0.4-0.8;
   wherein said modified polyurethane acrylate is selected from at least one of a amine modified polyurethane acrylate, a epoxy modified polyurethane acrylate, a polyether modified polyurethane acrylate and a unsaturated-epoxy modified polyurethane acrylate.

2. The pigmented UV-curable window-film coating according to claim 1, wherein said acrylate UV monomer comprises 1-4 parts by mass of acrylate monomers with mono functional group and 2-33 parts by mass of acrylate monomers with multiple functional groups, said acrylate monomer with mono functional group comprises one or more selected from at least one of, isooctyl acrylate, isobornyl methacrylate, phenoxyethyl acrylate and tetrahydrofurfuryl acrylate, said acrylate monomer with multiple functional groups comprises at least two selected from dipropylene glycol diacrylate, tripropylene glycol diacrylate, 1,6-hexanediol diacrylate, neopentyl glycol diacrylate, phthalate diethylene glycol diacrylate, trimethylolpropane triacrylate, pentaerythritol triacrylate, ethoxylated trimethylolpropane triacrylate, dioxolane acrylate, alkoxylated bisphenol A dimethacrylate and ethylene glycol acrylate methylphosphonate.

3. The pigmented UV-curable window-film coating according to claim 1, wherein said photoinitiator is selected from at least one of, 2-methyl-1-(4-methylthiophenyl)-2-morpholinyl-1-propanone, ethyl-4-dimethyl aminobenzoate, methyl-o-menzoylbenzoate, 4-phenylbenzophenone and 2,4,6-trimethylbenzoyl-diphenylphosphine oxide.

4. The pigmented UV-curable window-film coating according to claim 1, wherein said modified organosilicon leveling agent is selected from at least one of, polyether-polyester modified silicone emulsion and polydimethylsiloxane.

5. The pigmented UV-curable window-film coating according to claim 1, wherein said pigment is selected from at least one of, aniline black, Permanent Yellow, Permanent Orange G, Permanent Orange RL, Everbright Bronze Red, Lithol Red, Pigment Red G, Phthalocyanine Blue, Indanthrone, Phthalocyanine Green, Quinacridone Violet and $TiO_2$.

6. The pigmented UV-curable window-film coating according to claim 1, wherein said coupling agent is selected from at least one of, γ-aminopropyltriethoxysilane, 3-(2-aminoethyl)-aminopropyltriethoxysilane, N-phenyl-γ-aminopropyltrimethoxysilane and 3-(2,3-epoxypropoxy) propylmethyldiethoxysilane.

7. The pigmented UV-curable window-film coating according to claim 1, wherein said polymeric dispersant is selected from at least one of, amino acid ester copolymer, polyester-type copolymer and polyolefin copolymer.

8. The method of preparing the window-film coating according to claim 1, comprising:
   putting the pigment, acrylate UV monomer, polymeric dispersant, coupling agent and modified organosilicon leveling agent into a grinding miller and grinding for 1-3 hours and then filtering to obtain a slurry,
   putting the slurry obtained from Step 1 and the modified polyurethane acrylate into an agitated vessel and dispersing 10-30 minutes,
   putting the photoinitiator into the agitated vessel and mixing for 10-30 minutes to obtain said coating;
   wherein said modified polyurethane acrylate is selected at least one of a amine modified polyurethane acrylate, a epoxy modified polyurethane acrylate, a polyether modified polyurethane acrylate and a unsaturated-epoxy modified polyurethane acrylate.

* * * * *